June 3, 1930.  J. J. STEEDLE  1,762,036

DISK CHART TO DETERMINE COLOR RELATIONS

Filed Nov. 18, 1926   2 Sheets-Sheet 1

Joseph J. Steedle
INVENTOR

BY Victor J. Evans
ATTORNEY

June 3, 1930. J. J. STEEDLE 1,762,036
DISK CHART TO DETERMINE COLOR RELATIONS
Filed Nov. 18, 1926 2 Sheets-Sheet 2

Joseph J. Steedle
INVENTOR

BY Victor J. Evans
ATTORNEY

Patented June 3, 1930

UNITED STATES PATENT OFFICE

JOSEPH J. STEEDLE, OF SCRANTON, PENNSYLVANIA

DISK CHART TO DETERMINE COLOR RELATIONS

Application filed November 18, 1926. Serial No. 149,200.

This invention relates to a device for automatically determining the relationship between colors in light and shade. It is intended principally for the use of art students, designers, illustrators, etc., and will enable anyone whether possessed of an esthetic color appreciation or not to determine at a glance, once the color under given light conditions of any object to be portrayed is known, how to achieve brilliancy and vibration in color, what changes in hue occur in shadow and highlight under varying degrees of light, how to modify one color with another without loss of brilliancy, and how to attain artistic verisimilitude in painting.

I carry out my invention by the use of a base chart on which the primary colors of the spectrum together with the secondaries and intermediate colors are arranged into twelve equal sectors on a circular field, the several sectors being divided by radial lines. Beyond the rim of the color field is a band ⅛ inch deep that carries the designations of the twelve colors: yellow, yellow-green, green, blue-green, blue, blue-violet, violet, purple, crimson, scarlet, red, and orange, these being the commonly accepted names of the derivatives of the primary color sensations of prismatic colors, red, green and violet. The first variation in this equal division of the color field consists of bi-colored bands 3/16 inch deep with an inside radius of 1½ inches, which appear on alternate color sectors carrying the two colors of adjacent sectors. These overlapping colors are initialled for identification and carry numbers to indicate the relative proportion of their use. A further variation occurs on this base chart in the shape of two crescents, which carry only tints of the color sectors they traverse.

Associated with this base chart is a companion circular disk concentrically related thereto and pivotally connected therewith, in which a group of slotted openings are provided, permitting the several color panels to be displayed through the slots. This superposed disk also carries instructions for guiding the user, with darts and brackets instructive relative to the several colors needed to associate with the principal color employed in order to give artistic effect to a particular color value, contingent upon the comparative brilliancy of light on the object, whether it is low, medium or bright, and modified by the relative degree of reflection inherent in various surfaces of objects to be portrayed.

The superposed slotted rotary disk has a radius slightly less than the color field of the base chart so as to permit the several pigmented colors to be visible at its margin, and has radial lines corresponding to those on the base chart to allow a more accurate register and to facilitate the identification of the colors appearing through the slots with the names on the outer rim of the base chart. In using the device the largest opening marked "Lighted side" is brought into register with the particular color predominant in the object to be represented, being shifted on its pivot until it is brought into register. The two adjacent slots render visible the adjacent colors or color sectors of the charted group of base colors. Adjacent to the auxiliary slots just noted are two others to display a second color panel at each side, and having a radius to correspond with the variant bands on the base chart, so that when the lighted side opening is in place over any of the intermediate colors (orange, yellow-green, blue-green, blue-violet, purple, scarlet,) the overlapping pigment and spectrum colors with the identifying initials and numerals will be displayed through the slots. On a diametral line opposite the lighted side slot is another slot rendering visible the complementary color to that of the lighted side. On opposite sides of a diametral line cutting the sight opening are two elongated slots disclosing a group of colors. These slots are sections of a spiral whose radius increases the width of the opening for each 30 degrees (the arc of each color sector,) and are so placed with relation to the tinted crescents on the base chart that they display alternately full colors for one half the rotation of the disk and tints for the other half, thereby indicating what colors are to be used for shadows and for highlights respectively, and thus permit a change from the full colors showing through to the tints, or vice versa, by merely rotating the disk through one sector. These changes occur between the yellow and orange and between the violet and blue-violet sectors of the chart.

My invention also involves a color combination chart designed to present in compact and readily understood form a method of achieving artistic balance between colors and their complementaries without the need of experimenting. This chart is of similar construction mechanically to that of the spectrochrome just described, the base chart having the same form except that the variables (tint crescents and overlapping bands) are omitted. The rotating disk is divided by a line into the upper or color half and the lower or complementary half; and also by a circle into an outer and an inner circle. The upper half has eleven openings or slots with numbers and brackets identifying any sequence from 2 to 6. The lower half has eighteen openings or slots so placed and numbered that any sequence of the upper half can be properly matched by a sequence in the lower half.

My invention, therefore, consists of a color chart containing radial panels of cardinal colors with associated rotating slotted disk with instructions for modifying any cardinal color by juxtaposition of other colors to definite degrees of brilliancy according to the "pointelle" or "broken color" method of achieving vibration, and for arriving at the proper colors in shadows and highlights under varying degrees of illumination. It embodies other features the novelty of which will hereinafter be more fully described and definitely indicated in the accompanying claims.

Figure 1:
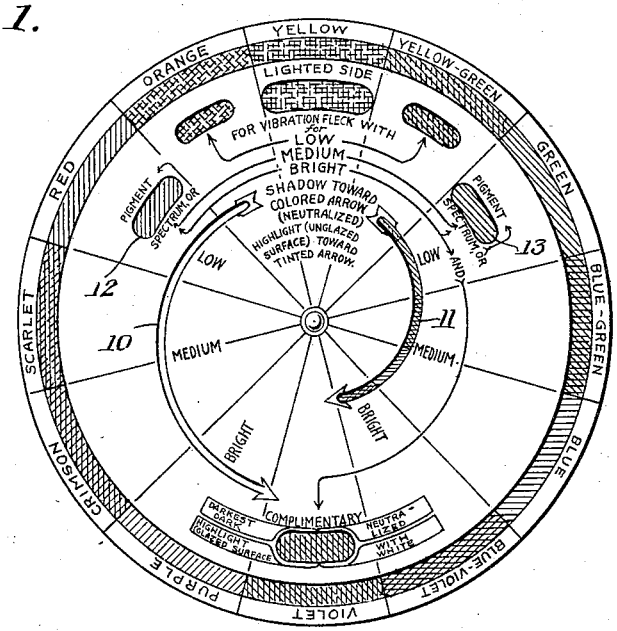
Figure 1 is a view illustrating my spectrochrome in assembled form.
Figure 2:
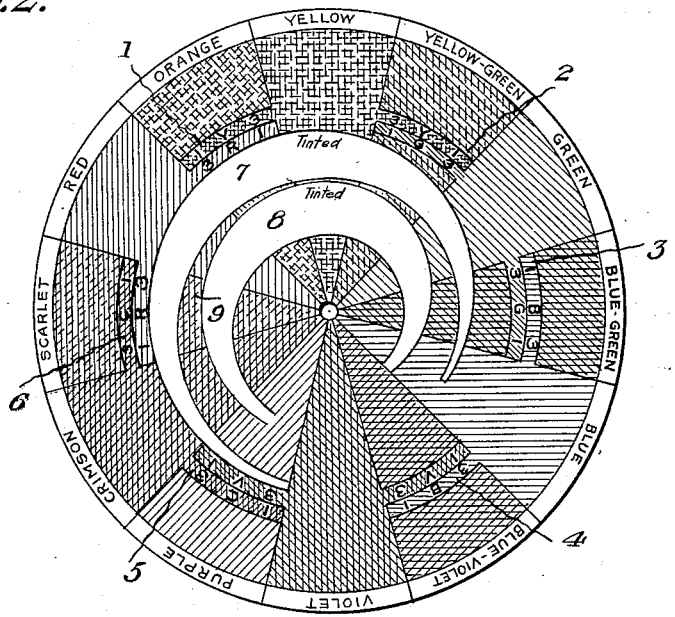
Figure 2 shows the lower section containing the color panels, tint crescents, and proportion instructions.

First with reference to the spectrochrome shown in Figures 1 and 2, on a circular field twelve radial lines subdivide into adjacent segmental panels a range of pigmented colors. These, as indicated by the marginal inscriptions, embrace hues capable of producing by blending with each other or with white any tone value met with in nature. Six of these segments have overlapping bands of adjacent colors with characteristic designations to instruct the student, as shown at 1, 2, 3, 4, 5 and 6, with radii coincident with the slots 12, 13, Figure 1, through which they appear when the sight opening is in register with any of the alternate intermediate colors beginning with orange. However, only one proportion numeral for each of the two bands appears in either opening owing to their placement relative to the sectors. Two crescent bands, 7, 8, at varying distances from the center are tinted, leaving a color section 9 between them, that narrows to a line where they meet. The tints are visible alternately under one or the other of the spiral-shaped arrow slots, 10, 11, see Figure 1, of the superposed rotary element of the chart. It will be seen that the upper member of the compound chart is of smaller diameter than the color section beneath, so that the colors are seen only through its slotted openings and at its marginal rim. The panel in use is adjusted with the opening marked "Lighted side" in register with the particular color nearest the tone of the object to be portrayed. As shown it is in register with yellow.

In using my spectrochrome chart to achieve vibration first determine the color of the "Lighted side" of the object to be painted, and place opening so marked over it. For example, place it over "Yellow." Below this opening will be noted the words "Low, Medium, Bright." These refer to the comparative brilliancy of light on the object. If it is "Low" and it is wished to give the color vibration, it should be flecked, or dappled over (not mixed), with the two adjacent colors indicated by the arrows (in this case "Orange" and "Yellow-green"), using each color separately and at the same value as color of "Lighted side." If the light is "Medium," one should in the same way use the two outside colors as indicated by the arrows, "Red" and "Green." If "Bright," these same two colors should be used in addition to the complementary, "Violet," as it will be noted that the arrow to the right continues down to the opening marked "Complementary."

Now, however, if one place the "Lighted side" opening over "Orange," the outside openings indicated by the arrows for "Medium" and "Bright" show up with two colors in each, the top colors "Pigment," and the lower "Spectrum" primaries. Either the two "Pigment" colors (C—"Crimson" and Y—"Yellow") or the two "Spectrum" colors (R—"Red" and G—"Green") can be used to give vibration. Say the choice be "Pigment." It will be noted to the left that the "Pigment" reads "C 1," and to the right, "3 Y," which means that the colors are to be used in about this proportion, more "Yellow" than "Crimson." This method obtains for all intermediate colors. Caution: Vibration will only result if the participating colors are kept separate and distinct, since the blending should take place in the eye of the beholder.

With respect to shadows: With the "Lighted side" "Orange," to determine the color of the object in shadow, follow the arrow opening that shows full colors, in this case to the left. Now if the light on the "Lighted side" of the object is comparatively "Low" the shadow would be "Scarlet" since that is the color showing through the arrow at the word "Low." If the light is "Medium" then the shadow would be either "Crimson" or "Purple." If "Bright", the shadow would be "Violet." The shadow color must, of course, be neutralized to a low value. The "Darkest dark" will be the complementary neutralized (in this case "Blue-violet"). It should be noted that "Yellow-orange" and "Violet-blueviolet" show colors and tints in both arrows and their shadows and highlights go both ways. Flesh, metallic and iridescent surfaces show this effect.

To neutralize any color add its own complementary. Placing "Lighted side" opening over "Scarlet" one finds that the opening opposite marked "Complementary" shows "Blue-green." So to neutralize or lower the value of "Scarlet" mix with "Blue-green"

With the "Lighted side" opening again over "Orange," to determine the color of the highlight (providing the surface is unglazed) follow the tinted arrow, in this case the one to the right. The "Low," "Medium" and "Bright" again refer to the amount of light on the lighted side. For "Low" the highlight would be white tinted with "Yellow-green." With more light on the object, or a smoother reflecting surface, the color opposite "Medium," "Green" or "Blue-green" would be used. With still more light or a better reflecting surface, the color showing at "Bright," tinting the white of the highlight with "Blue." With a highly reflecting or glazed surface, however, the white of the highlight would be tinted with the complementary as shown in the lower boxes, "Blue-violet."

Figure 3:
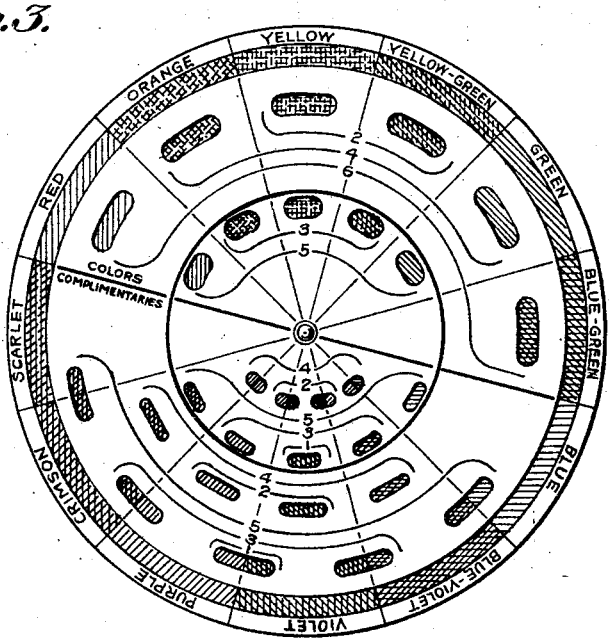
Figure 3 shows the assembled combination chart.
Figure 4:
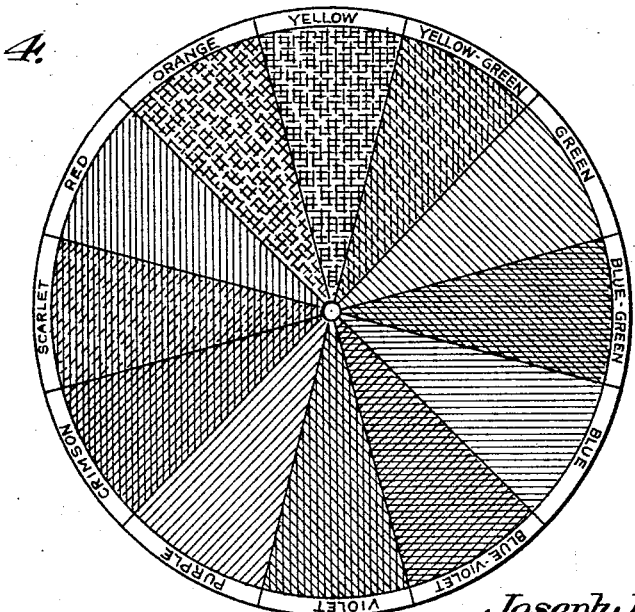
Figure 4 shows the lower section thereof.

The color combination chart, Figures 3 and 4, gives a method of associating a number of colors and their complementaries to give the painting balance. Suppose four colors are to be used. In the upper or color half of the disk is found the numeral 4 with its bracket enclosing four of the openings, so place this sequence of four over the colors decided upon, say, "Orange," "Yellow," "Yellow-green" and "Green." Now for the complementaries can be used four or less, say three. These will be found under the numeral 3 in the lower or complementary half of the disk, and since the four color openings occur in the outer circle on the opposite diametral limit, one must use the three openings in the same outer circle but in the complementary half and the colors will be "Crimson-purple," "Purple-violet" and "Violet-blueviolet."

If one use 5 as the number of colors, placing the corresponding openings in the upper half over "Red," "Orange," "Yellow," "Yellow-green" and "Green," the complementaries will be found in the lower half within the inner circle under the number desired (5 or less,) say 3. These will be "Purple," "Violet" and "Blue-violet." Should one just wish to use 2 complementaries, these would be "Purple-violet" and "Violet-blueviolet." It should be noted that when two colors appear in one opening, as in the last case, they should be mixed to attain the compound color.

When a more brilliant effect is desired one can syncopate by omitting the middle complementaries from any number over three, being sure, however, to balance by keeping an equal number on each end. Thus in the first example given, instead of the 3 complementaries one would omit the middle color, "Purple-violet," and use just "Crimson-purple" and "Violet-blueviolet."

Having thus described my invention, what I claim as new and desire to secure by Letters Patent is:

1. A color chart comprising a base, a circular field divided into color sections, overlapping color extensions arranged upon alternate color sections, proportional indicia upon said extensions, eccentrically arranged tinted bands intersecting the color sections, a mask rotatable upon the base over the field and having openings therein, said openings being arranged to render visible any selected color section and its complement to indicate a neutralizing color for the color of the section selected; to render visible any selected color section and the comparative brilliancy of light for the color of the section selected to determine its color in shadow; the comparative brilliancy of high light and shadows, and indicia to indicate the same.

2. A color chart comprising a base, a field divided into equal color sections defining panels of pigmented colors, eccentrically arranged spaced tinted bands upon the field, a mask rotatable upon the base over the field and having openings therein arranged to render visible a selected color and also having openings to render visible the tinted bands the comparative brilliancy of high lights and shadows of the color selected.

3. A color chart comprising a base, a circular field divided into color sections defining panels of pigmented colors, overlapping color extensions arranged upon alternate color sections and extending from and conforming in color to the adjacent color section, a mask rotatable upon the base over the field and having a sight opening therein for position over a color section to expose a color conforming to the lighted side of an object, said mask also having sight openings spaced upon opposite sides of the first mentioned opening to expose color sections and indicate colors to be used to obtain vibration with the first exposed color where the light is "Low", said mask having other openings spaced from the second mentioned openings to expose overlapping color extensions and indicate colors to be used to obtain vibration with the first exposed color where the light is "Medium", proportionate indicia upon the color extensions to indicate proportions of such colors, said mask having an opening to expose a complementary color to be used in connection with the first mentioned color and the color extensions to obtain vibration with said first mentioned color where the light is "Brilliant", and indicia upon the mask to indicate the particular openings to be used.

In testimony whereof I affix my signature.

JOSEPH J. STEEDLE.